(12) United States Patent
Bub et al.

(10) Patent No.: US 6,460,017 B1
(45) Date of Patent: Oct. 1, 2002

(54) ADAPTING A HIDDEN MARKOV SOUND MODEL IN A SPEECH RECOGNITION LEXICON

(75) Inventors: Udo Bub, München; Harald Höge, Gauting; Joachim Köhler, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,785
(22) PCT Filed: Sep. 10, 1997
(86) PCT No.: PCT/DE97/02016
§ 371 (c)(1),
(2), (4) Date: Jun. 10, 1999
(87) PCT Pub. No.: WO98/11534
PCT Pub. Date: Mar. 19, 1998

(30) Foreign Application Priority Data

Sep. 10, 1996 (DE) .......................... 196 36 739
Oct. 1, 1996 (DE) .......................... 196 40 586

(51) Int. Cl.$^7$ .............................................. G10L 15/00
(52) U.S. Cl. ..................................................... 704/256
(58) Field of Search ................................ 704/270, 251, 704/255, 254; 434/185

(56) References Cited

U.S. PATENT DOCUMENTS

| | | | | |
|---|---|---|---|---|
| 4,783,803 A | * | 11/1988 | Baker et al. ................. | 704/231 |
| 5,640,485 A | * | 6/1997 | Ranta .......................... | 704/251 |
| 5,717,829 A | * | 2/1998 | Rothenberg ................. | 704/270 |
| 5,805,771 A | * | 9/1998 | Muthutamy et al. ........ | 704/231 |
| 5,864,810 A | * | 1/1999 | Digalakis et al. ........... | 704/255 |

FOREIGN PATENT DOCUMENTS

| | | |
|---|---|---|
| DE | OS 42 22 916 | 6/1993 |
| EP | 0 388 067 | 9/1990 |

OTHER PUBLICATIONS

Parsons, tW, Voice and Speech Processing, McGraw Hill, pp. 170–175, Dec. 1987.*

"Identification of Mono– and Poly–phonemes Using Acoustic–phonetic Features Derived by a Self–organising Neural Network", Dalsgaard et al., in Proc. ICSLP '92, pp. 547–550, Banff, 1992.

(List continued on next page.)

Primary Examiner—David D. Knepper
(74) Attorney, Agent, or Firm—Bell, Boyd & Lloyd LLC (57) ABSTRACT

When adapting a lexicon in a speech recognition system, a code book of hidden Markov sound models made available with a speech recognition system is adapted for specific applications. These applications are thereby defined by a lexicon of the application that is modified by the user. The adaption ensues during the operation and occurs by a shift of the stored mid-point vector of the probability density distributions of hidden Markov models in the direction of a recognized feature vector of sound expressions and with reference to the specifically employed hidden Markov models. Compared to standard methods, this method has the advantage that it ensues on-line and that it assures a very high recognition rate given a low calculating outlay. Further, the outlay for training specific sound models for corresponding applications is avoided. An automatic adaption to foreign languages can ensue by applying specific hidden Markov models from multi-lingual phonemes wherein the similarities of sounds across various languages is exploited. Given the methods for the acoustically phonetic modelling thereby employed, both language-specific as well as language-independent properties are taken into consideration in the combination of the probability densities for different hidden Markov sound models in various languages.

17 Claims, 2 Drawing Sheets

OTHER PUBLICATIONS

"Methods for Improved Speech Recognition Over the telephone Lines", Hauenstein et al., in Proc. ICASSP '95, pp. 425–428, Detroit, 1995.

"ASCII Phonetic Symbols for the World's Languages: Worldbet.",Hieronymus, preprint, 1993.

"A Course in Phonetics", Ladefoged, Harcourt Brace Jovanovich, San Diego, 1993.

Data–driven Identification of Poly– and Mono–phonemes for Four European Languages:, Andersen et al., Proc. EUROSPEECH '93, pp. 759–762, Berlin, 1993.

"The OGI Multi–language Telephone Speech Corpus", Muthusamy et al., in Proc. IC–SLP '92, pp. 895–898, banff, 1992.

"An Evaluation of Cross–Language Adaption for Rapid HMM Development in a New Language", Wheatley et al., Proc. ICASSPP, Adelaide, 1994, pp. 237–240.

"The Lincoln–Large Vocabulary Stack–Decoder HMM CSR", Paul et al., vol.2 of 5, Apr. 27, 1993, IEEE.

"Task Adaptation for Dialogues via Telephone Lines," Bub, Proceedings of $4^{th}$ International Conference of Spoke Language Processing, Oct. 3–6, 1996, pp. 825–828.

"In–Service Adaptation if Multilingual Hidden–Markov–models," Bub et al., 1997 IEEE International Conference on Acoustics, Speech, and Signal Processing, Apr. 21–24, 1997, pp. 1451–1454.

A Bayesian Approach to Speaker Adaptation For the Stochastic Segment Model, Necioglu et al., Speech Processing I, Mar. 23–26, 1992, pp. 437–440.

"Adapting a Large Vocabulary Speech Recognition System to Different Tasks," Alto et al., Signal Processing Theories and Applications, Sep. 18–21, 1990, vol. II, pp. 1379–1382.

"Techniques For Task Independent Word Spotting in Continuous Speech Messages," Hofstetter et al., Speech Processing II, Mar. 23–26, 1992, vol. II, pp. 101–104.

"Vocabulary Learning and Environment Normalization in Vocabulary–Independent Speech Recognition," Hon et al., Speech Processing I, Mar. 23–26, 1992, vol. I, pp. 485–488.

"On Vocabulary–Independent Speech Modeling", Hon et al., Proc. IEEE Intern. Conf. on Acoustics, Speech, and Signal Processing, Albuquerque NM, 1990.

"Speaker Adaptation Based on MAP Estimation of HMM Parameters", Lee et al., Proc. IEEE Intern. Conf. on Acoustics, Speech and Signal Processing, Minneapolis MN, 1993.

"Training Data Clustering for Improved Speech Recognition", Sankar et al., in Proc. EUROSPEECH '95, pp. 503–506, Madrid, 1995.

* cited by examiner

ADAPTING A HIDDEN MARKOV SOUND MODEL IN A SPEECH RECOGNITION LEXICON

BACKGROUND OF THE INVENTION

1. Field of the Invention

The invention is directed to a method for adapting hidden Markov models to operating demands of a speech recognition systems, particularly using specifically formed, multilingual hidden Markov sound models that are adapted to an applied language.

2. Description of the Prior Art

A speech recognition system essentially accesses two independent sources of knowledge. First, there is a phoneme lexicon with which the vocabulary to be recognized is defined as vocabulary. For example, the ASCII strings of the individual words to be recognized as well as their phonetic transcription are stored there. This lexicon also prescribes what is referred to as a "task". Second, there is a code book that contains the parameters of the hidden Markov sound models (HMM) and, thus, particularly contains the midpoints of the probability density distributions belonging to recognition segments.

The best performance of a speech recognition system can be observed when the HMM code book is optimally adapted to the lexicon. This is the case when the HMM code book is operated together with that lexicon with which this HMM code book was also initially produced by training. When this cannot be assured, then a deterioration in performance is observed.

The problem often arises in speech recognition systems as utilized, for example, in switching systems that the initially trained vocabulary with which this system is delivered is modified by the customer during operation. This usually results therein that co-articulations between phonemes that could not be previously trained occur given the new words. There is thus a mismatch between lexicon and HMM code book, which leads to a deteriorated recognition performance in practical operation.

A practical example of such a situation would be a telephone exchange of a company that understands the names of the employees and automatically recognizes the connection request of a caller on the basis of his speech input and forwards the call to the corresponding extension (call-by-name). The names of the employees are thus stored in the lexicon. The names will change over and over again due to fluctuation, and the system will therefore exhibit an unsatisfactory recognition performance for said reasons.

In order to assure an optimally high recognition performance of a speech recognition system under the described conditions of use, it is thus necessary to implement an adaption of the underlying HMM code book of this recognition system to the newly established task. Different methods for solving this problem are known from the prior art. Hon. H. W., Lee K. F., "On Vocabulary-Independent Speech Modeling", Proc. IEEE Intern. Conf. on Acoustics, Speech, and Signal Processing, Albuquerque N. Mex., 1990 discloses a solution wherein it is proposed to implement a retraining for adaption of the code book to the lexicon. This procedure has the disadvantage that the vocabulary of the ultimate application is generally only partly known at the time of training. If the retraining must then be started at a later point in time, then all potentially required acoustic models of a new vocabulary must be kept on hand, which is uneconomical and would be difficult to implement in practice.

What is referred to as a MAP algorithm (maximum a posteriori) for the adaptation of the acoustic models by the user on the basis of a specific set of speech samples is disclosed by Lee C. H., Gauvain J. L., "Speaker Adaption Based on MAP Estimation of HMM Parameters", Proc. IEEE Intern. Conf. on Acoustics, Speech and Signal Processing, Minneapolis Minn., 1993. The purchaser of the speech recognition system must thereby make speech samples of a number of speakers available. The re-adaption of the code book thereby ensues by monitored learning, i.e. that the system must be informed of the correct transliteration of an expression. The complicated work steps that are thereby required cannot be expected of a customer.

Both solutions from the prior art have the common disadvantage that they only sequence off-line. For an HMM code book adaption, thus, the running system must be shut down so that the new parameters, i.e. the corresponding recognition units can be played into the system. Further, the procedures of training and adaption require a long time for being worked in and implemented, which means a financial disadvantage for the purchaser. An initial code book for the HMM is therefore often offered when the product is delivered. Two training strategies for this are available from the prior art.

On the one hand, the code book can be generated on the basis of a phonetically balanced training dataset. Such code books offer the advantage that they can handle all conceivable applications of unknown tasks since they do not prioritize any recognition units. The speech recognition system is thereby trained to exactly the same vocabulary that plays a part in the ultimate application. A higher recognition rate for the specific application is thereby mainly achieved in that the speech recognition system can make use of co-articulations that it already received in the training phase. However, such specialist code books exhibit poorer performances for applications wherein the lexicon changes.

When the lexicon and, thus, the vocabulary of the ultimate application can be modified, or is even entirely unknown at the training time, then manufacturers must, sometimes with difficulty, work an optimally generally prepared code book into their speech recognition systems.

D. B. Paul et al., "The Lincoln-Large Vocabulary Stack-Decoder HMM CSR", Vol. 2 of 5, Apr. 27, 1993, IEEE also discloses that a speech recognition system be adapted to a new speaker in real time. Since, however, the vocabulary in this known system is limited and fixed, it cannot be derived from the Paul et al. article as to how that a modification of the vocabulary could be implemented with such a method.

A significant problem is also that new acoustic phonetic models must be trained for every language in which the speech recognition technology is to be introduced in order to be able to implement a national match. HMMs for modelling the language-specific sounds are usually employed in speech recognition systems. Acoustic word models that are recognized during a search process in the speech recognition procedure are subsequently compiled from these statistically modelled sound models. Very extensive speech data banks are required for training these sound models, the collection and editing of these representing an extremely cost-intensive and time-consuming process. Disadvantages thereby arise when transferring a speech recognition technology from one language into another language since the production of a new speech data bank means, on the one hand, that the product becomes more expensive and, one the other hand, causes a time delay in the market introduction.

Language-specific models are exclusively employed in standard purchasable speech recognition systems. Extensive speech data banks are collected and edited for transferring these systems into a new language. Subsequently, the sound models for the new language are retrained from square one with these collected voice data.

In order to reduce the outlay and the time delay when transferring speech recognition systems into different languages, an examination should thus be made to see whether individual sound models are suitable for employment in different languages. P. Dalsgaard and O. Anderson, "Identification of Mono- and Poly-phonemes using acoustic-phonetic Features derived by a self-organising Neural Network", in Proc. ICSLP '92, pages 547–550, Banff, 1992 discloses already provides approaches for producing multi-lingual sound models and utilizing these in the speech recognition in the respective languages. The terms polyphoneme and monophoneme are also introduced therein, with polyphonemes defined as sounds whose sound formation properties are similar enough over several languages in order to be equated. Monophonemes indicate sounds that exhibit language-specific properties. So that new speech data banks do not have to be trained every time for such development work and investigations, these are already available as a standard as described in P. Dalsgaard, O. Andersen and W. Barry, "Data-driven Identification of Poly- and Mono-phonemes for four European Languages:, in Proc. EUROSPEECH '93, pages 759–762, Berlin, 1993, J. L. Hieronymus, "ASCII Phonetic Symbols for the World's Languages: Worldbet. " preprint, 1993, and A. Cole, Y. K. Muthusamy and B. T. Oshika, "The OGI Multi-language Telephone Speech Corpus", in Proc. IC-SLP '92, pages 895–898, banff, 1992 discloses that existing multi-lingual models be employed for the segmentation of the speech data in a target language. The training of the sound models is then implemented in the target language. Further prior art for multilingual employed of sound models is not known.

SUMMARY OF THE INVENTION

An object of the present invention is to provide a method for adaptation of an HMM in a speech recognition system wherein the adaptation ensues during the ongoing operation of the speech recognition system. In particular, the above-described complications that derive from the modification of the lexicon and, thus, of the task should be compensated by the adaptation.

This object is achieved in accordance with the principles of the present invention in a method for real-time adaptation of a hidden Markov sound model, in the code book of a speech recognition system, to a vocabulary modification in the phonetic lexicon which is employed, wherein hidden Markov sound models which are to be recognized are maintained available in the code book according at least to an average value vector representing their respective probability distributions, wherein a speech recognition procedure is conducted in a conventional manner by extracting feature vectors from a speech signal and allocating the feature vectors to the probability distributions of the hidden Markov sound modules from the code book, and wherein the position of the average value vector of at least one hidden Markov sound model is scaled to the position of the allocated feature vector by a defined adaptation factor for at least one recognized sound expression of the vocabulary modification, immediately after the recognition thereof, and wherein the adapted average value vector is then stored in the code book as the average value vector for that hidden Markov sound model, in place of the previously-stored vector.

A further object of the invention is to provide a method for the formation and adaptation of specific multi-lingually employable HMMs in a speech recognition system with which the transfer outlay of speech recognition systems into another language is minimized in that the parameters in a multi-lingual speech recognition are reduced.

This object is also achieved in accordance with the principles of the present invention in a version of the above-described inventive method wherein, proceeding from at least one first feature vector for a first sound in a first language, and proceeding from at least one second feature vector for a comparably spoken second sound in at least one second language, and their respective associated first and second hidden Markov sound models, a determination is made as to which of the two hidden Markov sound models better describes both feature vectors, and the hidden Markov model which better describes both feature vectors is then employed for modeling the sound in both languages.

The inventive approach provides that a code book that is kept general and that, for example, contains HMMs that are employed for several languages be employed as seed model and that, given a modified lexicon, it be adapted to this new lexicon during ongoing operation.

An adaption during operation is especially advantageously achieved in an embodiment of the method wherein an already recognized feature vector of a sound expression leads to a shift of the stored center of gravity vector in the HMM code book in that a shift of the mid-point of the probability distribution of the hidden Markov model in the direction of the recognized feature vector ensues with an adaption factor during operation after recognition of the word or of the sound sequence. The learning rate can thereby be arbitrarily set by the adaption factor.

In the method, the allocation of the feature vectors to the HMMs can be advantageously implemented with standard methods such as the Viterbi algorithm. By employing the Viterbi algorithm. an unambiguous allocation of the feature vectors to the stored mid-point vectors of the HMM code book exists after the recognition.

Especially advantageously, the sound models to be adapted and to be recognized are kept available in a standardized HMM code book that can serve as basis for all models of practice to be adapted and thus has to be trained only once upon production for all systems to be adapted or, respectively, only has to be offered in the form of a code book with multi-lingual HMMs.

The adaptation of the center of gravity vector to the recognized feature vectors given Laplacian and Gaussian probability density distributions of the hidden Markov models ensues especially advantageously with the specifically indicated equations since this involves an comparatively low calculating outlay.

Given the disclosed method, an even higher recognition rate is advantageously achieved when, given an uncertainly recognized sound expression, this is completely rejected and no adaptation ensues.

The number of sound hypotheses after the Viterbi search and their appertaining hit rates of the respective hypotheses with reference to the expression are especially advantageously taken into consideration in the rejection. In this case, the rejection is made dependent on the differences between the hit rates since these differences represent a quality particular for the quality of the found solution. Preferably, no rejection can ensue given great differences, and a rejection must ensue given small differences. A threshold of the differences in the hit rates is preferably defined for this case, a rejection ensuing when this is downwardly transgressed since the monitoring of a threshold requires only slight calculating outlay.

One advantage of the disclosed method is therein that a statistical similarity criterion is utilized that allows that sound model whose characteristic best describes all feature vectors of the respective sound that are available to be selected from a given plurality of different sound models for similar sounds in different languages.

The logarithmic probability distance between the respective HMMs and each and every feature vector is advantageously determined as criterion for the selection of the best HMM for different sound feature vectors. As a result a criterion is made available that reflects experimental findings with respect to the similarity of individual sound models and their recognition rates.

The arithmetic mean of the logarithmic probability distances between each HMM and the respective feature vectors is advantageously formed as criterion for the description of an optimally representative HMM since a symmetrical distance value is thereby obtained.

The description criterion for the representative property of an HMM for describing sounds in different languages is advantageously formed by the use of Equations 5 through 8 set forth below, since little calculating outlay arises as a result.

A barrier condition with which a recognition rate of the representative HMM can be set is advantageously prescribed for the application of s description criterion.

The memory outlay for a speech library is especially advantageously reduced by the method since one model can be employed for several languages. The transfer outlay from one language into the other is likewise minimized, this creating a reduced time expenditure for the transfer, which can also be reduced to zero by the on-line adaption. Just as advantageously, less of a calculating outlay is enabled in the Viterbi search since fewer models have to be checked, for example given multilingual input systems.

Special HMMs for employment in multilingual speech recognition systems are especially advantageously utilized. As a result of this procedure, HMMs for sounds in several languages can be combined into polyphoneme models, wherein overlap areas of the standard probability density distributions employed in the various models are investigated. An arbitrary number of standard probability density distributions identically employed in the different models can be employed for describing the polyphoneme model. Advantageously, a number of standard distributions from different speech models can also be employed without the smearing of the individual speech is characteristics caused as a result leading to a significantly lower recognition rate given the use of this model. The distance threshold value of five between similar standard probability distribution densities has proven to be especially advantageous here.

Upon utilization of the method, HMMs are especially advantageously modelled with three states of initial sound, median sound and final sound, since an adequate precision in the description of the sounds is thereby achieved and the calculating outlay in the recognition and on-line adaptation in a speech recognition means remains low.

DESCRIPTION OF THE PREFERRED EMBODIMENTS

Figure 1:
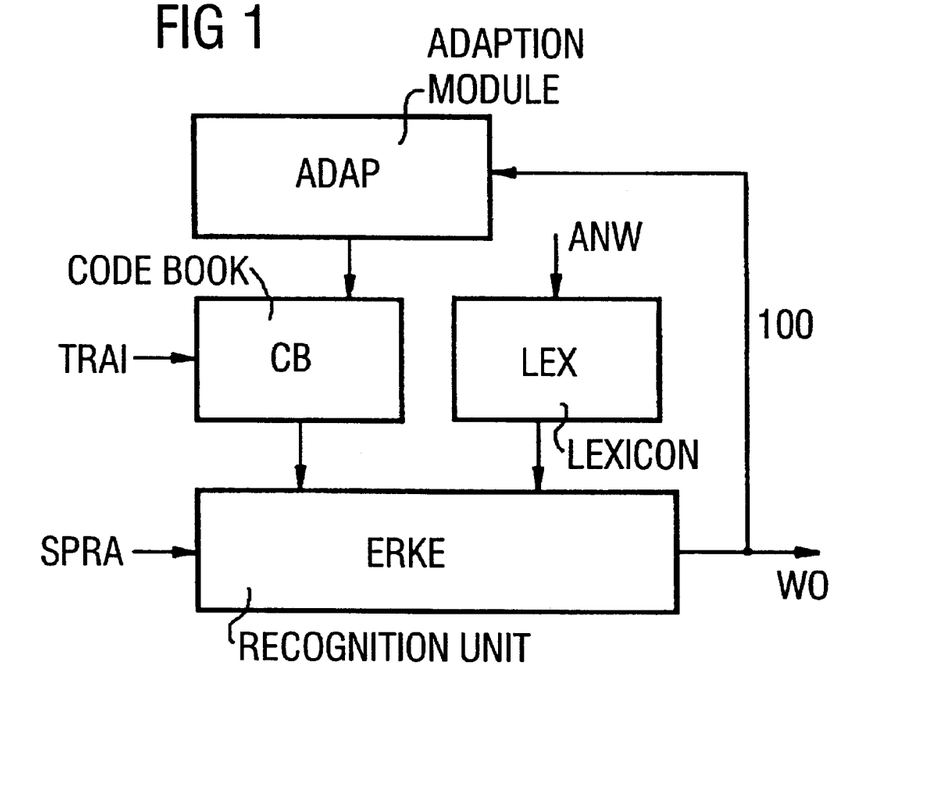
FIG. 1 shows a block diagram of a speech recognition method with code book adaptation in accordance with the inventive method.

In the form of a block diagram, FIG. 1 schematically illustrates the basic processing performed by a speech recognition systems operating according to the method. Speech SPRA is recognized in a recognition unit ERKE of the speech recognition system and is emitted as an output in the form of word WO. Sub-units of words can also have been modelled by hidden Markov models HMM and output as words WO. For example, word strings ANW predetermined by the manufacturer are deposited in the form of ASCII characters for the application in a lexicon LEX of the speech recognition system. Previously trained parameters for hidden Markov sound models supplied with the lexicon LEX are deposited in an HMM code book CB. For a multi-lingual application of the speech recognition system, the lexicon can also contain HMMs that are specifically offered or formed for a multi-lingual application. The speech recognition unit ERKE implements the recognition of words from speech signals SPRA on the basis of the lexicon LEX and the HMM code book CB. For adaptation of the speech recognition system to a specific application, the lexicon LEX can, for example, be modified by the user with application-specific word strings ANW. To this end, word strings can also be input in a foreign language as warranted. In this context foreign language is that a language was not taken into consideration in the preparation of the code book. After recognition of a specific word or of a recognition unit WO, according to the method, an adaption module ADAP is informed via a connecting line 100 of which of these words was recognized and which segments are connected therewith. An adaption of the parameters of the hidden Markov models connected to the recognized word subsequently preferably ensues at the feature vector that was derived from the speech signal. For example, an adaption strategy to be preferably implemented for the adaption of the hidden Markov models can be defined in the adaption module ADAP. In one adaption version, for example, words with uncertain hit rates for the individual hypotheses after the Viterbi search can be omitted. Since new co-articulations are to be learned according to the invention, preferably only those feature vectors that are specifically allocated to the co-articulation segments to be newly learned are selected for adaption. On a case-by-case basis, however, it can be more beneficial to select all available feature vectors for adaption in order to assure that co-articulations that extend beyond a diphoneme are also covered by the adaption.

The center of gravity vector of the underlying hidden Markov models is adapted to the feature vector in that, for example, an averaging is implemented by components and this averaging leads to a shift of the feature vector stored in the code book CB. To this end, the respective averages are multiplied by an adaption factor that functions here as learning step width, so that a new center of gravity of the hidden Markov model stored in the lexicon or, respectively, of the stored hidden Markov models arises. This adapted center of gravity vector functions as initial quantity in future in the recognition of speech signals in the speech recognition unit ERKE.

The basic inventive concept is that the system is automatically retrained or, respectively, re-adapted during the application given the occurrence of a lexicon that is modified and prescribed by the user. For example, such a modification is found in that word strings ANW input into the lexicon LEX are compared to the lexicon content. In this way, word strings in a foreign language can also be simply identified in order, as warranted, to utilize specific multilingual HMMs. Simultaneously with the input of the word string into the lexicon, a first input of the word as speech SPRA preferably ensues in order to produce a first allocation between the HMMs present in the code book CB and the word to be newly recognized. This adaptive retuning of the recognition parameters inventively ensues on the basis of speech data that arise during the operation of the system. The adaption is thereby preferably re-adjusted given every modification, without the respective vocabulary for the production of the lexicon LEX having to be known during the development phase of the speech recognition system. Compared to the prior art, the inventive method exhibits the advantage that it sequences on-line without requiring a set of specific speech samples for the training. As a result thereof, the possibility of adapting multi-lingual HMMs on-line to a foreign language likewise derives. According to the adaption method, the adaptation thereby preferably ensues unsupervised in the background of the system, to which end it employs its own results for the adaption during the application. The calculating steps thereby required are relatively simple to implement and require a low computer capacity.

The underlying inventive concept is that the speech recognition is based on HMMs. In particular, the parameters for calculating the emission probabilities are determined when training such models. The probability densities required for the calculation are approximated by standard distributions such as, for example, Gaussian or Laplacian distributions. The most important parameter for this approximation is thereby the mid-point vector or, respectively, the center of gravity vector of the respective distributions. These parameters are stored in the code book. During the speech recognition, an allocation of individual speech units that are represented by feature vectors to specific recognition segments and the corresponding probability density distributions exists in the recognition with what is referred to as the Viterbi algorithm after the classification. According to the inventive method, the actual adaption step preferably ensues with a recalculation of the mid-points of the affected probability density distributions upon employment of the feature vectors that have arisen in the application. Especially advantageously, the adaption is thereby implemented after every terminated expression as soon as the Viterbi path with the unambiguous allocation of feature vectors to probability density distributions is present.

One problem that the invention solves is that it is not possible to train a large, vocabulary-independent hidden Markov model so as to be able to handle all requirements from all conceivable practical applications (see the aforementioned Hon et al. article). Especially strict demands are thereby to be made of practical applications. Adaption methods for speech recognition should thereby have little calculation expenditure and be simple to implement, work unsupervised, independent of speaker, on-line and not require a prior adaption set in advance. Particularly for the application in the inventive method, an HMM code book should be utilized as seed model that was trained independent of vocabulary, so that it exhibits no features and preferences of any kind of specific recognition unit. For example, the underlying HMM can be trained as monophonemic models; however, hidden Markov models with connected diphonemes can also be utilized. hidden Markov models that were monophonemically trained were employed as seed model when testing the inventive method. The strategy in the adaption of the code book according to the method is to employ its general monophonemic seed model as an initial starting point, for example even for multi-lingual HMMs, and; to employ phonemic inventory for producing a workable diphoneme model whenever the lexicon is modified and a new context-dependent segment must be produced for modified operating requirements. The respective model is preferably adapted on-line during the recognition process. The following steps are preferably implemented for this purpose:

First, the lexicon LEX is searched in order to find out what context-dependent segments are needed.

When a surfacing segment was hitherto unknown, the corresponding context-independent segment distributions are copied from the general model into the new model of the working dictionary.

Recognition of entering speech expressions.

Case-by-case rejection of uncertain recognition results when desired.

On-line training of the working code book with the described adaption formula on the basis of the entering speech data.

For adaption of the models, the center of gravity vector of the recognized hidden Markov models is adapted to the feature vector of the entering speech signal. A shift of the center of gravity vector stored in the lexicon in the direction of the recognized feature vector of the corresponding sound expressions is thereby preferably implemented according to a learning rate. It is thereby assumed that the relevant differences between the task-specific versions of the lexicon mainly concern the parameters of the probability density distribution of the hidden Markov models, whereby the location of the averages in the acoustic space is particularly affected.

An entering expression is preferably transformed into a series of feature vectors by a feature extraction unit of a speech recognition system:

$$X=\{\vec{x}_1, \vec{x}_2, \ldots \vec{x}_T\} \quad (1)$$

Upon employment of the Viterbi algorithm, for example, every individual feature vector $\vec{x}_t$ with t=1, 2, ... T is then allocated to a status $\Theta^i_t$ of the best hidden Markov model i after the recognition. When multi-modal Laplace distributions are employed for the modellings of hidden Markov models and the status emission probabilities, the corresponding probability density distribution of the $S^{th}$ status of a hidden Markov model can be approximated as follows:

$$b^i_s(\vec{x}) = \sum_{m=1}^{M^i_s} c^i_{s,m} e^{\frac{\sqrt{2}}{\sigma}|\vec{x}-\vec{\mu}^i_{s,m,t}|} \quad (2)$$

$M^i_s$, $C^i_{s,m}$ and $\sigma$ are constants that are preferably defined during the training. The average $\vec{\mu}_{s,m,ti}$ that lies closes to the feature vector $\vec{x}_t$ is then determined with a given allocation of a recognized feature vector and a state, whereby the city block spacing (2*) is utilized as dimension an n references the components of a vector.

$$\|\vec{x}-\vec{\mu}\| = \sum_n |x_n - \mu_n| \quad (2^*)$$

The average spacing lying closest is thereby updated according to $$\vec{\mu}^i_{s,m,t+1}=(1-\alpha)\vec{\mu}^i_{s,m,t}+\alpha \vec{x}_t \quad (3)$$

Equation 3 can be imagined as follows, geometrically interpreted. The updated center of gravity vector $\vec{\mu}^i_{s,m,t+1}$ lies on a straight line that proceeds through the old mid-point vector is $\vec{\mu}_{s,m,t}^{i}$ and the current feature vector $\vec{X}_t$. The parameter α is thereby employed as adaption factor or as learning rate. No adaption is implemented for the specific case that α=0 applies, whereas the current center of gravity vector corresponds to the current feature vector for α=1.

Recognition errors can likewise occur in all applications of dialogue systems. The causes are thereby comprised, for example, in an incorrect input word by the user or simply in an incorrect classification by the recognition unit. When such an error occurs, for example, a dialogue manager should prompt the user to repeat the input. As a simplification, however, an especially good expression can also merely be selected. For example, a relatively simple statistical rejection strategy is employed for this purpose. The hit rate $S_0$ of the best and the hit rate $S_1$ of the second-best sound hypothesis according to the n-best search in the Viterbi algorithm is thereby investigated.

$$\text{rejectionflag} = \begin{pmatrix} 1 & \text{if } (s_1 - s_0) \leq r_{thresh} \\ 0 & \text{else} \end{pmatrix} \quad (4)$$

When the rejection mark amounts to rejectionflag 1, then the corresponding expression is preferably suppressed by the adaption algorithm. The barrier for the rejection is preferably determined in that $S_{mean}$, i.e. the mean of all hit rates per word of entering expression, is empirically determined. The limit value $R_{thresh}=0.005\ S_{mean}$ is preferably derived from experiments. A rejection rate of incorrect expressions of 61.2% is achieved with this limit value, and the adaption can thereby be implemented with more reliably classified data than would be the case if no rejection were implemented. An experimental review of the method was based on 2000 test expressions of a modified vocabulary for the adaption. It was thereby found with respect to the adaption factor α and its dimensioning that small values of α, i.e. 0.025, already significantly reduce the error rate in the recognition. A broad optimum of a was thereby found between 0.05 and 0.01. Given an optimum of 0.075, an improvement of the error rate of 34.5% was thereby achieved in the recognition of words. As a result of the inventive method, this means that recognition units can recognize 34.5% better with the adapted code book than would be the case without the application thereof.

When a rejection is implemented as described, an improved value of the adaption factor α at 0.125 derives. This improved value of a leads to a reduction of the error rate by 40.1% given the experimentally employed vocabulary. The higher factor of α can be explained on the basis that a better feature vector for the adaption of the HMM code book is present due to the rejection of incorrect data and, thus, a higher learning step width can be employed. These experimental findings have also shown that the adaptive method achieves nearly the same recognition rate as would be achieved for a specific model for the corresponding application. The recognition rate thereby lay only 0.7% below that of the special lexicon.

Figure 2:
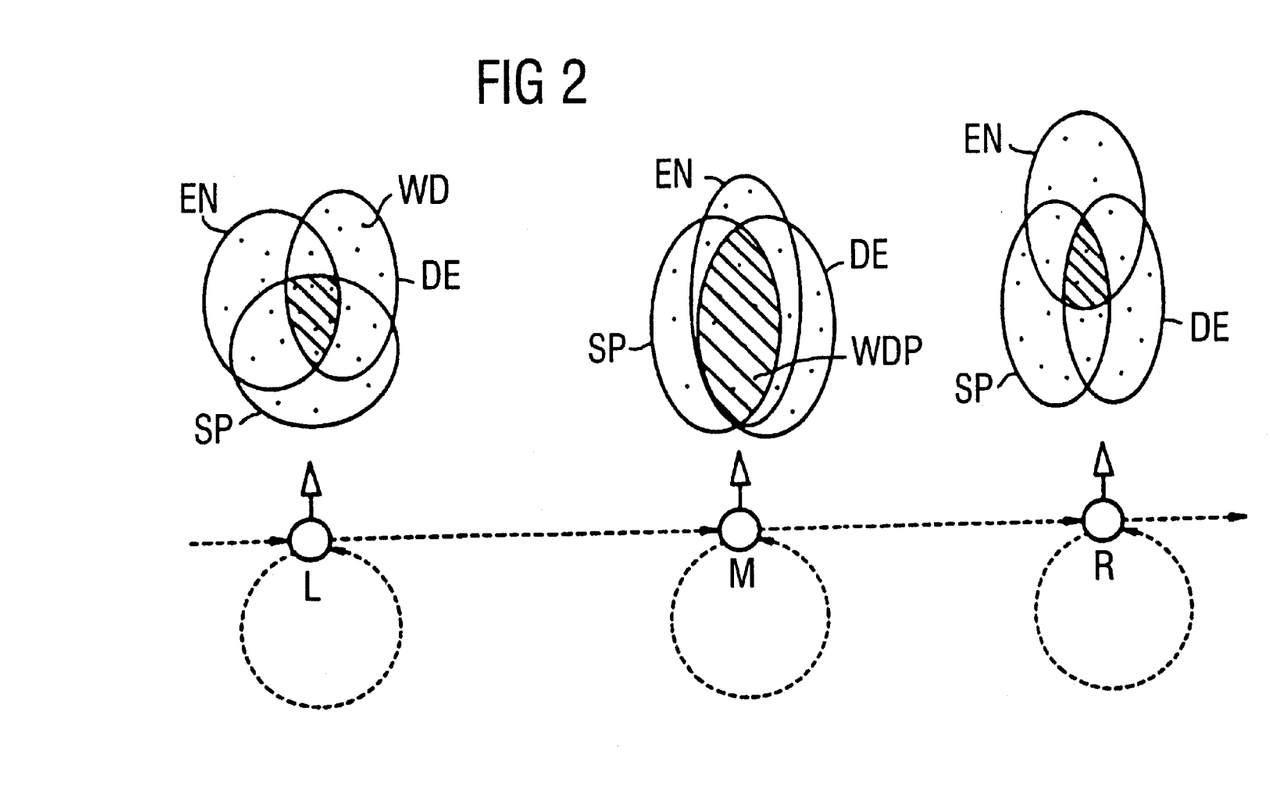
FIG. 2 schematically illustrates the structure of a single multilingual phoneme, used in the inventive method.

FIG. 2 shows the structure of a single multilingual phoneme. In this case, the phoneme M is shown. The number of probability densities and the recognition rate for this phoneme are indicated in Table 1.

| Thr. | #densit(a, b, c). | Engl. [%] | Germ. [%] | Span. [%] |
|---|---|---|---|---|
| 0 | 341(0 0 341) | 46.7 | 44.7 | 59.4 |
| 2 | 334(0 14 327) | 45.0 | 46.4 | 57.5 |
| 3 | 303(27 34 280) | 48.0 | 45.8 | 57.5 |
| 4 | 227(106 57 187) | 50.9 | 44.1 | 58.7 |
| 5 | 116(221, 48, 72) | 49.3 | 43.1 | 57.0 |
| 6 | 61(285, 22, 34) | 41.2 | 38.6 | 50.4 |

FIG. 2 shows the initial sound L, the median sound M and the final sound R of the phoneme model. The centers of gravity of the probability density distributions of the individual standard probability densities are entered and referenced as WD for the different languages, English EN, German DE and Spanish SP. An HMM composed of three sub-states is shown here by way of example. The invention, however, is not to be limited only to such HMMs, even though these represent a certain optimum taking the criterion into consideration that a minimum calculating outlay of the recognition should be implemented. The invention can likewise be applied to HMMs that exhibit a different number of states. What the invention is especially intended to achieve is that the transfer outlay given the transfer of speech recognition systems into another language is reduced or, avoided and that the calculating resources employed are kept as low as possible by reduction of the underlying parameters. For example, such speech recognition systems can meet limited hardware demands better, particularly when one and the same speech recognition system for multilingual application in one apparatus is to be made available.

For achieving the goal of the invention, to exhaust the similarities of sounds in different languages and consider them in the modelling, it should first be noted that the phonemes can differ in various languages. The primary reasons for this are:

different phonetic contexts because of the different phoneme sets in the various languages;
different manners of speaking;
different prosodic features;
different allophonic variations.

An especially important aspect that must be taken into consideration is the principle of sufficient perception-oriented distinguishability of the phonemes (see, for example, P. Ladefoged, "A course in Phonetics", Harcourt Brace Jovanovich, San Diego, 1993). This means that individual sounds in various languages are kept acoustically distinguishable, so that it is easier for the individual listeners to separate them from one another. Since, however, every individual language has a different store of phonemes, the boundaries between two similar phonemes are language-specifically defined in every individual language. For these reasons, the expression of a specific sound has a language-specific component.

The phonemes are preferably modelled with continuous density hidden Markov models (CD-HMM) (see for example, A. Hauenstein and E. Marschall, "methods for improved Speech Recognition Over the telephone Lines", in Proc. ICASSP '95, pages 425–428, Detroit, 1995). Laplace mixtures are often used as density functions. Each individual phoneme is thereby preferably composed of three states directed from left to right HMM. The acoustic feature vectors are thereby composed, for example, of 24 mel-scaled cepstral, 12 delta delta cepstral, energy, delta energy and delta delta energy coefficients. For example, 25 ms is selected as length of the examination time window, whereby the frame spacings amount to 10 ms between the individual frames. Only context-independently generated phonemes are preferably applied for reasons of the limited size of the language corpus. A particularly well-suited phoneme inventory is described in the aforementioned article by Hieronymus.

In the method, first, a similarity criterion is made available in order to select that HMM from standard, available speech phoneme libraries for different languages that comes closest to the feature vectors that are derived from the different sound models of the different languages. As a result, it is possible to determine the similarity of two phoneme models and, via this similarity criterion, to make a statement based on the difference of the log likelihood values between the sound realizations and sound models as to whether it is worth modelling a sound for several languages in common or, to employ an appertaining HMM that already exists for modelling the sound in a plurality of languages. As a result, the number of parameters to be taken into consideration in the speech recognition is reduced in that the number of HMMs to be examined is reduced.

A second approach of the invention is comprised in employing a specific polyphoneme model to be produced for modelling a sound in several languages. To this end, three sound segments, for example, are first formed in the form of an initial sound, median sound and final sound, their states being composed of a number of probability density functions, what are referred to as mixed distribution densities with the appertaining densities. These densities of the sound segments that are similar over various languages are then compiled to form a multilingual code book. Sound segments of various languages thus share the same densities. The code book can be simultaneously employed for several languages with, the weightings, for example, with which the densities are weighted being separately determined and offered for each language.

HMMs with three states are preferably utilized for forming a suitable similarity criterion. The distance or similarity criterion can thereby be used in order to combine a plurality of phoneme models to form a multilingual phoneme model or to replace these in a suitable way. As a result, a multilingual phoneme inventory can be developed. A measured quantity that is based on the relative entropy (see, for example, V. Digalakis, A. Sankar, F. Beaufays, "Training Data Clustering for Improved Speech Recognition", in Proc. EUROSPEECH '95, pages 503–506, Madrid, 1995) is preferably employed for measuring the distance or, for determining the similarity of two phoneme models of the same sound from different languages. During the training, the parameters of the mixed Laplacian density distributions of the phoneme models are thereby determined. Further, a set of phoneme tokens X as feature vector is extracted for each phoneme from a test or development language corpus. These phonemes can thereby be marked by their internationally standardized phonetic label. Accordingly, two phoneme models $\lambda_i$ and $\lambda_j$ and their appertaining phoneme token $X_i$ and $X_j$ are handled as follows for determining the similarity criterion between these different phonemes.

$$d(\lambda_i, \lambda_j) = \log p\ (X_i|\lambda_i) - \log p(X_i|\lambda_j) \tag{5}$$

This distance criterion can be viewed as log likelihood distance that represents how well two different models match with the same feature vector $X_I$. Accordingly, the distance between the two models $\lambda_i$ and $\lambda_j$ is determined according to:

$$d(\lambda_j, \lambda_j) = \log p(X_j|\lambda_j) - \log p(X_j|\lambda_j) \tag{6}$$

In order to obtain a symmetrical distance between these two phoneme models, this is preferably determined according to $$d(\lambda_j;\lambda_i) = \frac{1}{2}(d(\lambda_i,\lambda_j) + d(\lambda_j;\lambda_i)) \tag{7}$$

It was determined on the basis of experimental findings that some phoneme models from different languages are definitely better-suited for the employment in a German speech recognition system than a German phoneme model. This, for example, is true of the phonemes k, p and N. The English phoneme model is better-suited for these phonemes than the German. For example, a great difference between the German and the English model was observed with respect to the diphthong aü (German) and oi (English), which means that a different symbol should be introduced in the multilingual phoneme inventory for the two sounds. On the other hand, a great similarity was found for the diphthong ai in German and in English, which means that only one phoneme model can be employed equally well for both languages. Proceeding therefrom, a separate statistical model should be generated for each symbol of a multilingual phoneme inventory. In the aforementioned Dalsgaard, article polyphonemes were referred to as phonemes that are similar enough in order to be modelled as a single phoneme in various languages. One disadvantage of this procedure is comprised therein that the complete acoustic space of the polyphoneme is employed for the language-specific recognition. The goal, however, is to combine the language-dependent and the language-specific acoustic properties of a multilingual model. According to the invention, those areas of the acoustic space wherein the employed probability densities of the individual phonemes overlap are to be delimited in a polyphoneme model. To this end, for example, an agglomerative density cluster technique is utilized in order to reduce identical or similar expressions of a phoneme. It is especially important to note that only the densities of the corresponding states of the individual HMMs must be combined in the phonemes.

It can be seen in FIG. 2 that the respective densities for the individual states L, M and R are contained in the delimited areas. Whereas identical densities are distributed over the individual languages EN, DE and SP, the mixing weightings vary language-dependently. However, it should also be taken into consideration in this evaluation that specific expressions of a phoneme in different languages occur in differing frequency.

The combination of the different probability densities can thereby be implemented with a different distance threshold for the probability densities in the density clustering. With a distance threshold of five, for example, the number of densities employed was reduced by a factor 3 compared to the initial condition without being thereby accompanied by a critical deterioration in the speech recognition rate. In this case, 221, 48 and 72 of the original 341 initial densities were respectively combined for the polyphoneme region, the bilingual region and the monolingual region. FIG. 2 shows such a polyphoneme region as meet of the circles for the individual languages. Given the median sound M of the illustrated HMM, for example, a probability density in such a region is referenced as WDP. The recognition rates for a complete multilingual speech recognition system are thereby recited in columns 4 and 5 of Table 2 as ML1 and ML2.

| Language | # Tokens | LDP [%] | ML1 [%] | ML2 [%] |
|---|---|---|---|---|
| English | 21191 | 39.0 | 37.3 | 37.0 |
| German | 9430 | 40.0 | 34.7 | 37.7 |
| Spanish | 9525 | 53.9 | 46.0 | 51.6 |
| Total | 40146 | 42.8 | 38.8 | 40.8 |

Whereas the conventional polyphoneme definition from the aforementioned Dalsgaard article was employed in the first investigation ML1, which means that the complete acoustic region of the polyphoneme model composed of the outer contour of the speech regions in FIG. 2 was employed for the recognition, the inventive method uses only a sub-region therefrom. For example, an improvement of 2% can be achieved in that the partial overlap of the individual language regions is utilized for the individual modelling of the polyphoneme model, as shown in the column for ML2 in Table 2.

The recognition precision of the models can be improved by the combination of multi-lingual sound models with the automatic on-line adaption method. They are adapted to the new application vocabulary or, respectively, to the new language with an unsupervised adaption. Advantageously, no additional data for the new language need be collected for this purpose. When universal sound models are employed, the method can be utilized for arbitrary languages. For example, a single word recognition system for Slovenian numbers can be optimized by on-line adaption with multi-lingual sound models from data of the German, American and Spanish languages. To this end, the recognition unit is merely supplied with Slovenian data material in the recognition procedure.

Although modifications and changes may be suggested by those skilled in the art, it is the intention of the inventors to embody within the patent warranted hereon all changes and modifications as reasonably and properly come within the scope of their contribution to the art.

What is claimed is:

1. A method for real-time adaption of a hidden Markov sound model, stored in a code book of a speech recognition system to a vocabulary modification in a phonetic lexicon employed in the speech recognition system comprising the steps of:
   making hidden Markov sound models to be recognized available in the code book according to an average value vector of their respective probability distributions;
   conducting a speech recognition procedure by extracting feature vectors from a speech signal and allocating the feature vectors to the probability distributions of the hidden Markov sound models from the code book; and
   scaling a position of the average value vector of at least one of said hidden Markov sound models to the position of the allocated feature vector via a defined adaption factor for at least one recognized sound expression of the vocabulary modification in the phonetic lexicon immediately after recognition thereof to produce an adapted average value vector, and storing the adapted average value vector in the code book as the average value vector for said at least one of said hidden Markov models.

2. A method according to claim 1, comprising scaling the vector position by component-by-component averaging and multiplication by a constant adaption factor.

3. A method according to claim 1 comprising allocating the feature vectors to the corresponding hidden Markov sound models using the Viterbi algorithm.

4. A method according to claim 1 comprising:
   registering a sequence of feature vectors having the form $$x = \{\vec{x}_1, \vec{x}_2, \ldots \vec{x}_T\}$$

in the speech recognition procedure;
   making said hidden Markov sound models available according to a center of gravity vector of their respective Laplacian probability distributions having the form $$b_s^i(\vec{x}) = \sum_{m=1}^{M_s^i} c_{s,m}^i e^{\frac{\sqrt{2}}{\sigma} \|\vec{x} - \vec{\mu}_{c,m,t}^i\|}$$

with constants $M_s^i, c_{s,m}^i$, $\sigma$ determined during training; and
   adapting the position of the center of gravity vector of at least one hidden Markov sound model the position of the appertaining feature vector according to $$\vec{\mu}_{s,m,t+1}^i = (1-\alpha) \vec{\mu}_{s,m,t}^i + \alpha \vec{x}_t$$

for at least one recognized sound expression after recognition thereof to produce an adapted center of gravity vector, wherein $\vec{\mu}_{s,m,t+1}^i$ is a component of the adapted center of gravity vector and $\alpha$ is an adaption factor.

5. A method according to claim 1 wherein, if an unrecognized sound expression occurs, rejecting said unrecognized sound expression and no scaling is implemented.

6. A method claim 5 comprising following an n-best search in a Viterbi algorithm, determining a first hit rate for a first sound hypothesis and determining a second hit rate for a second sound hypothesis, and classifying a sound expression as an unrecognized sound expression dependent on a difference between said first and second hit rates.

7. A method according to claim 6, comprising classifying a sound expression as an unrecognized sound expression when an amount of the difference between the first and second hit rates falls below a predetermined amount.

8. Method according to one of the claims 1–7 for adaption of a multilingual hidden Markov sound model formed in the following way:
   a) proceeding from at least one first hidden Markov sound model (L, M, R) for a first sound in a first language (SP, EN, DE) and from at least one second hidden Markov sound model (L, M, R) for a comparably spoken second sound in at least one second language (DE, SP, EN), a polyphoneme model is formed such that the standard probability distributions (WD) employed for the modelling of the first and second Markov sound model (L, M, R) are respectively joined to form a new standard probability distribution (WDP) up to a defined distance threshold that indicates up to which maximum distance between two standard probability distributions (WD) these should be united, and only the joined standard probability distributions characterize the polyphoneme model;
   b) this polyphoneme model is employed for the modelling of the sound in at least both languages (DE, SP, EN).

9. A method as claimed in claim 1, comprising the steps of:

(a) identifying a first feature vector for a first spoken sound in a first language;

(b) identifying a first hidden Markov sound model, from among the Markov sound models in said code book, which most closely models said first feature vector;

(c) identifying a second feature vector for a second spoken sound, comparable to said first spoken sound, in a second language;

(d) identifying a second hidden Markov sound model from among said Markov sound models in said code book, which most closely models said second feature vector;

(e) employing a predetermined criterion to select one of said first and second hidden Markov sound models as better modeling both of said first and second feature vectors; and (f) modeling said first spoken sound and said second spoken sound in both of said first and second languages using said one of said first and second hidden Markov sound models.

10. A method as claimed in claim 9 wherein identification of the first hidden Markov sound model which most closely models said first feature vector in step (b) and identification of said second hidden Markov sound model which most closely models said second feature vector in step (d) comprise identifying a logarithmic probability distance as a log likelihood distance between each Markov sound model in said code book and said first feature vector and said second feature vector, respectively, with a shorter logarithmic probability distance denoting a better modeling.

11. A method as claimed in claim 10 comprising the additional step of forming an arithmetic mean of said logarithmic probability distance between each Markov sound model in said code book and said first feature vector and said second feature vector, respectively.

12. A method as claimed in claim 11 wherein said first hidden Markov model is for a phoneme $\lambda_i$, wherein said second hidden Markov sound model is for a phoneme $\lambda_j$, and wherein $X_i$ represents said first feature vector and wherein $X_j$ represents said second feature vector, and wherein the step of identifying the logarithmic probability distance for said first feature vector comprises using the relationship $$d(\lambda_i, \lambda_j) = \log p(X_i|\lambda_i) - \log p(X_i|\lambda_j)$$

and wherein the step of identifying the logarithmic probability distance for said second feature vector employs the relationship $$d(\lambda_j, \lambda_j) = \log p(X_j|\lambda_j) - \log p(X_j|\lambda_j)$$

and wherein the step of forming said arithmetic mean employs the relationship $$d(\lambda_j, \lambda_i) = \frac{1}{2}(d(\lambda_i, \lambda_j) + d(\lambda_j, \lambda_i)).$$

13. A method as claimed in claim 12 comprising the additional step of employing the selected one of said first and second hidden Markov sound models from step (e) for modeling of said first and second spoken words in step (f) only if $d(\lambda_j; \lambda_i)$ satisfies a defined barrier condition.

14. A method as claimed in claim 9 comprising the additional step of providing a library of three-state Markov sound models as said code book, each three-state Markov sound model comprising a sound segment of initial sound, median sound and final sound.

15. A method as claimed in claim 1, comprising the steps of:

(a) identifying a first hidden Markov sound model for a first spoken sound in a first language, said first hidden Markov sound model having a first standard probability distribution associated therewith;

(b) identifying a second hidden Markov sound model for a second spoken sound, comparable to said first spoken sound, in a second language, said second hidden Markov sound model having a second standard probability distribution associated therewith;

(c) combining said first standard probability distribution and said second standard probability distribution to form a new standard probability distribution up to a defined distance threshold, said defined distance threshold identifying a maximum distance between said first and second probability distributions within which said first and second standard probability distributions should be combined;

(d) forming a polyphoneme model using said new standard probability distribution only within said defined distance threshold and modeling said first and second sounds in both of said first and second languages using said polyphoneme model.

16. A method as claimed in claim 15 wherein said distance threshold is five.

17. A method as claimed in claim 15 comprising employing a three-state Markov sound model as said first hidden Markov sound model in step (a), said three-state Markov sound model comprising an initial sound segment, a median sound segment and a final sound segment of said first sound, and employing a three-state Markov sound model as said second hidden Markov sound model formed by an initial sound segment, a median sound segment and a final sound segment of said second sound.

* * * * *